July 10, 1951 — L. A. KEMPTON — 2,560,293
THERMOSTATIC FLUID MIXING VALVE
Filed Jan. 2, 1947 — 6 Sheets-Sheet 1
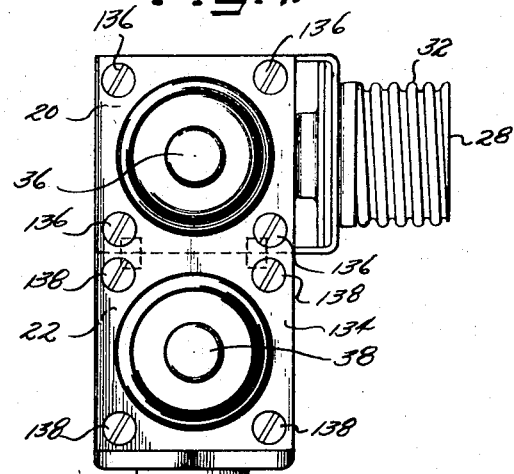
Fig. 1.
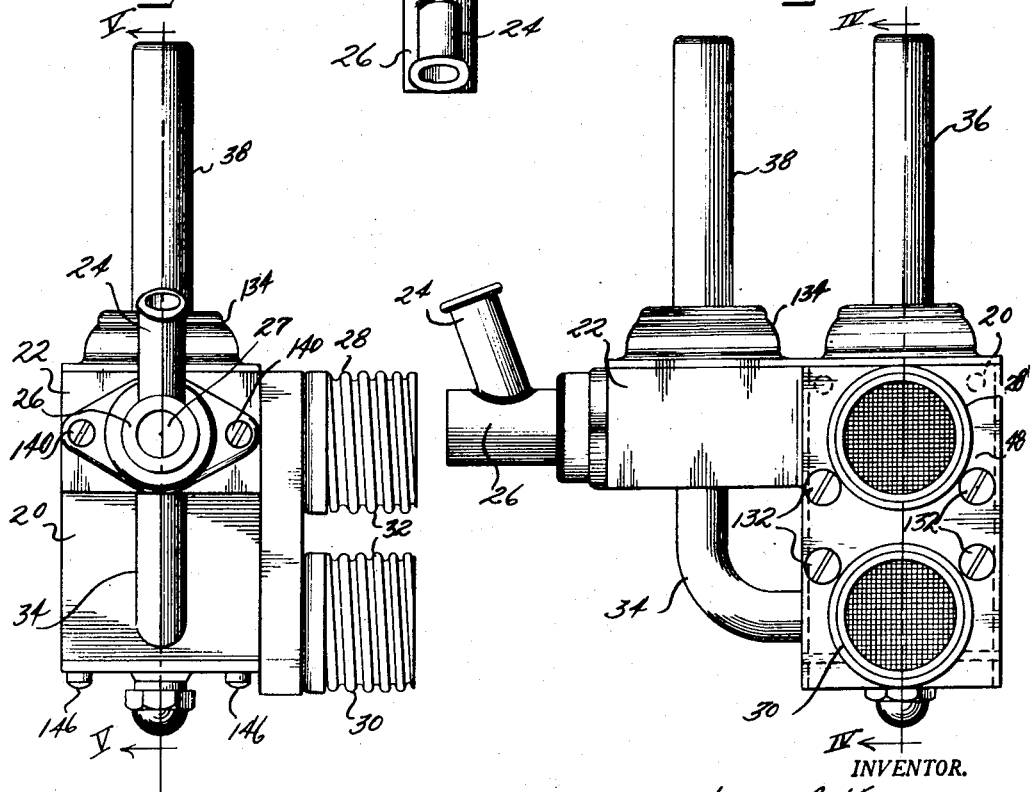
Fig. 2. Fig. 3.
INVENTOR.
LESLIE A. KEMPTON
BY
Attys.

July 10, 1951 L. A. KEMPTON 2,560,293
THERMOSTATIC FLUID MIXING VALVE
Filed Jan. 2, 1947 6 Sheets—Sheet 2
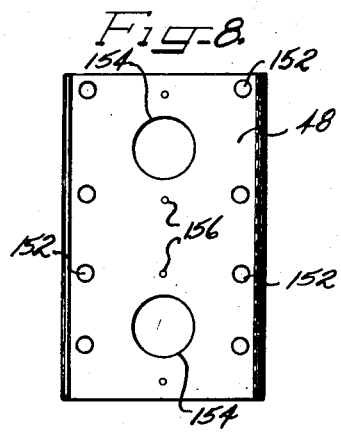
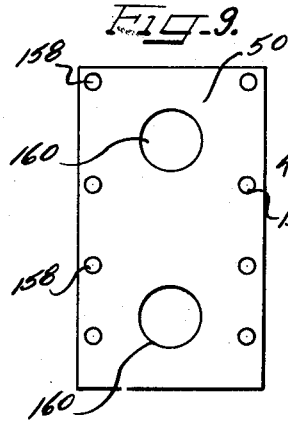
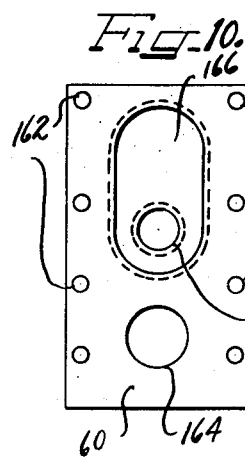
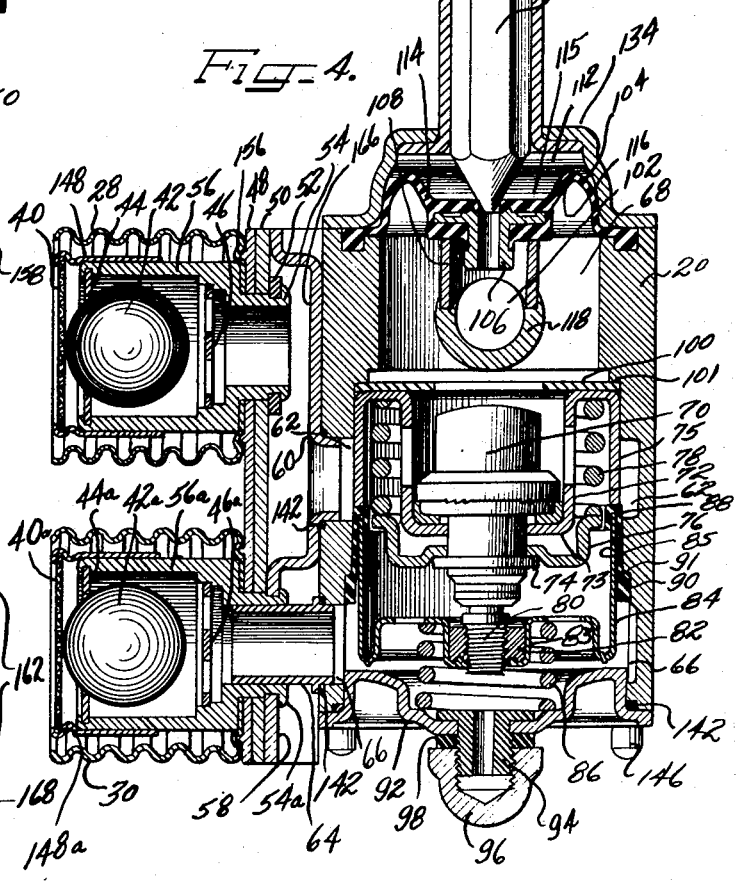
INVENTOR.
LESLIE A. KEMPTON
BY
Attys.

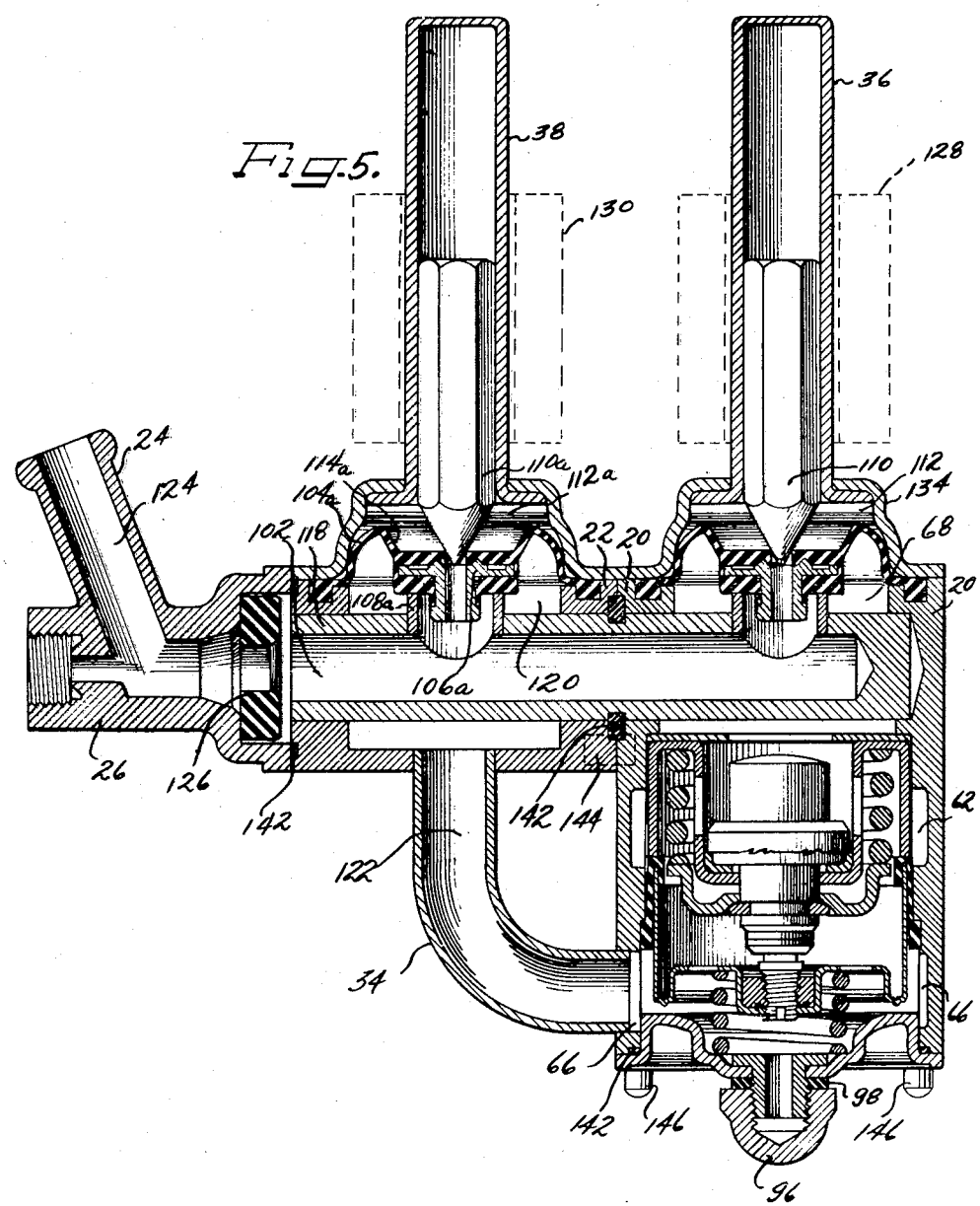

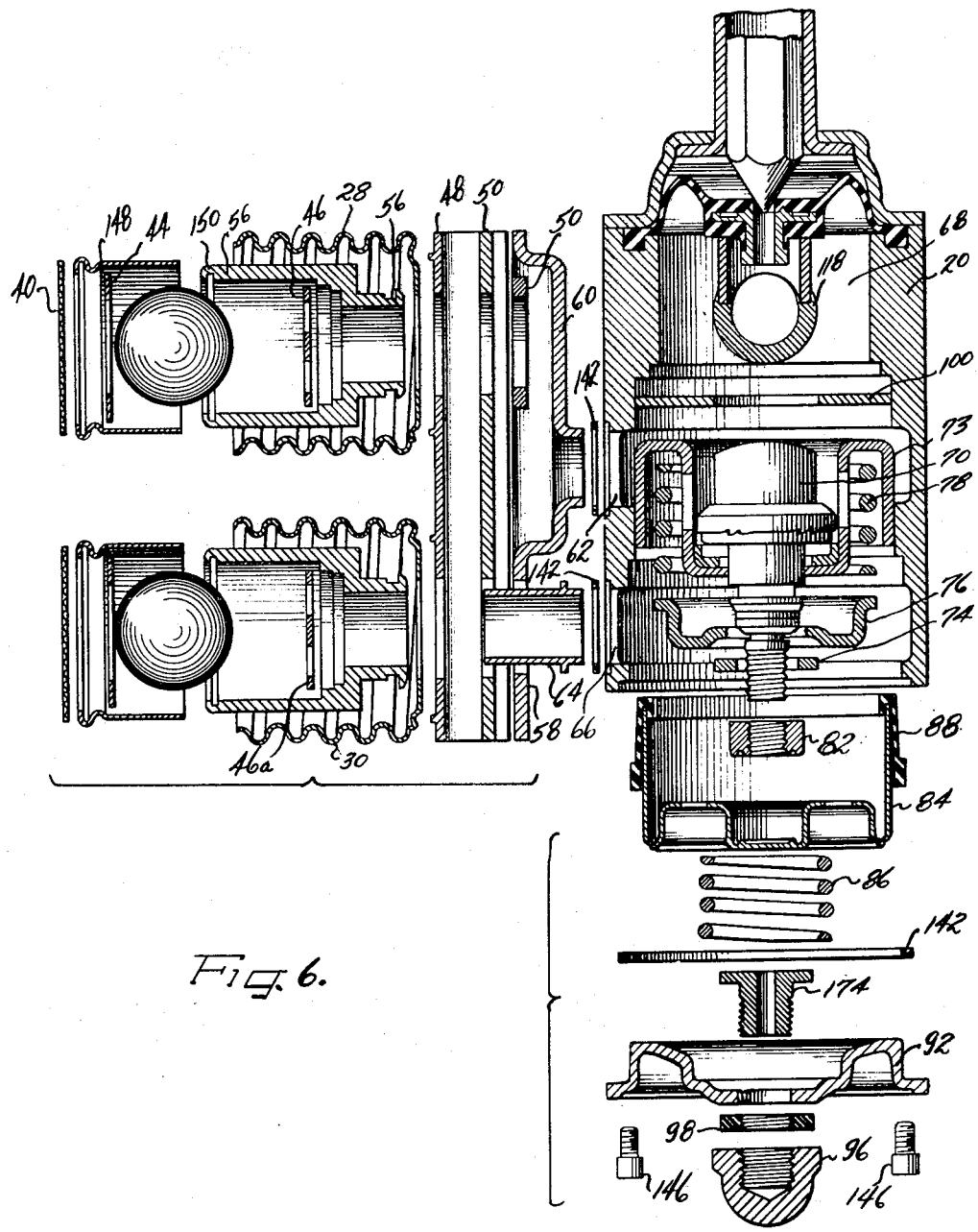

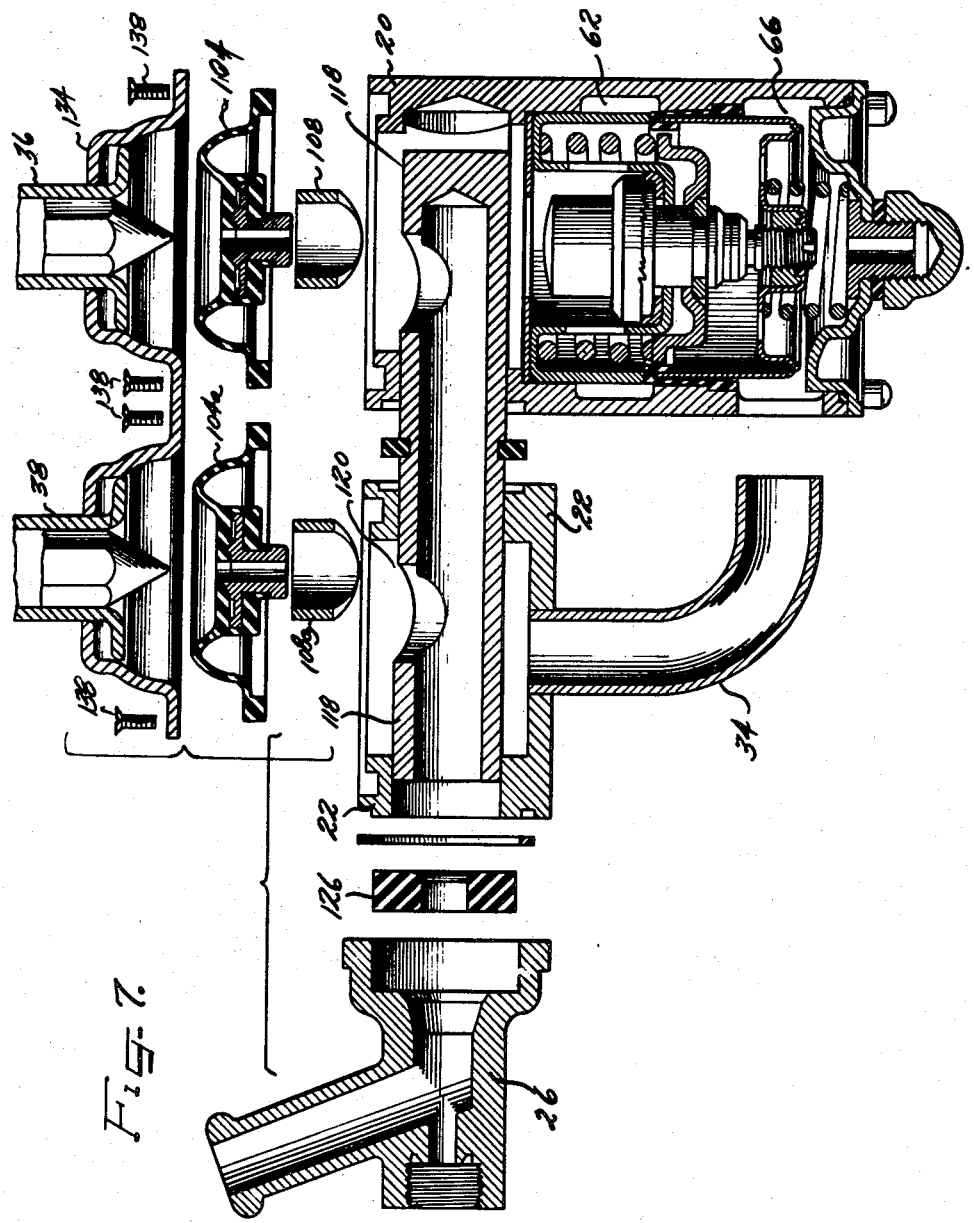

July 10, 1951 L. A. KEMPTON 2,560,293
THERMOSTATIC FLUID MIXING VALVE
Filed Jan. 2, 1947 6 Sheets-Sheet 6

INVENTOR.
LESLIE A. KEMPTON

Patented July 10, 1951

2,560,293

UNITED STATES PATENT OFFICE 2,560,293

THERMOSTATIC FLUID MIXING VALVE

Leslie A. Kempton, St. Petersburg, Fla., assignor to The Dole Valve Company, Chicago, Ill., a corporation of Illinois Application January 2, 1947, Serial No. 719,827

9 Claims. (Cl. 236—12)

My invention relates to fluid mixing valves.

In one type of automatic fluid mixing valve, streams of fluid from two sources at different temperature are admitted to a common mixing chamber containing a thermostatic control element. This element is connected to a valve mechanism for proportioning the quantity of fluid from the two separate streams so as to maintain the fluid in the chamber at a desired constant temperature. If it is desired alternately to obtain a fluid stream of a second predetermined temperature, fluid from one of the incoming streams may be by-passed about the mixing valve so that the combined stream issuing from the valve is of the temperature for which the mixing valve is set as modified by the additional stream. A fluid mixing valve of this type is disclosed in the copending application of Thomas B. Chace, Serial No. 502,629, filed September 16, 1943, now abandoned, assigned to the same assignee as the present invention.

It is an object of my invention to provide an improved thermostatically controlled fluid mixing valve.

Another object of my invention is to provide an improved thermostatically controlled fluid mixing valve that requires no intricate and expensive castings.

Another object of my invention is to provide an improved thermostatically controlled fluid mixing valve wherein the component parts may be manufactured by low cost stamping or machining operations from readily available stock materials.

Another object of my invention is to provide an improved thermostatically controlled mixing valve that may be readily assembled by mass production operations.

It is yet another object of my invention to provide an improved thermostatically controlled mixing valve wherein the metal surfaces exposed to the flow of fluid are smooth, thus minimizing fluid friction and the tendency for deposits of dirt, salts, etc. thereon.

My invention further resides in features of construction, combination and arrangement, whereby an improved thermostatically controlled mixing valve having inherently low cost is provided.

The novel features which I believe to be characteristic of my invention are set forth with particularity in the appended claims. My invention, itself, however, both as to its organization and method of operation, together with further objects and advantages thereof, may best be understood by reference to the following description taken in connection with the accompanying drawing.

On the drawing:

Figures 1, 2, and 3 are top, end, and side views respectively of a thermostatically controlled fluid mixing valve of the by-pass type constructed in accordance with my invention;

Figure 4 is a cross-sectional view through line IV—IV, Figure 3;

Figure 5 is a cross-sectional view through V—V, Figure 2;

Figures 6 and 7 are views corresponding to Figures 4 and 5, respectively, except that component parts of the mixing valve are spaced relative to each other to indicate in further detail the construction thereof;

Figure 11:
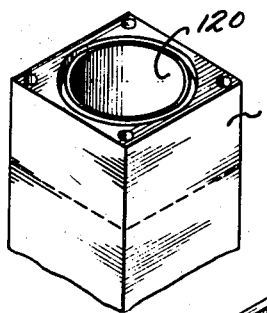
Figure 12:
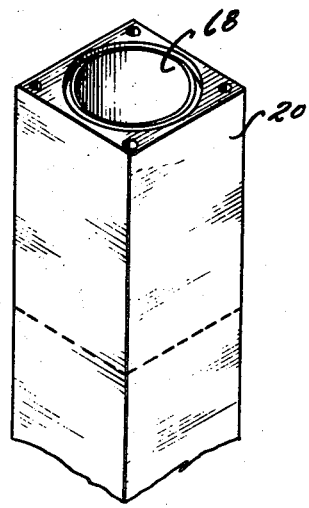
Figure 13:
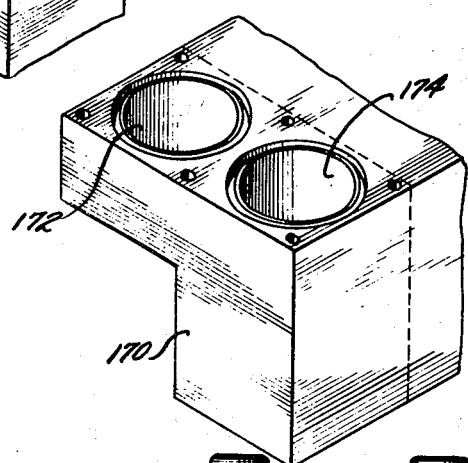
Figure 14:
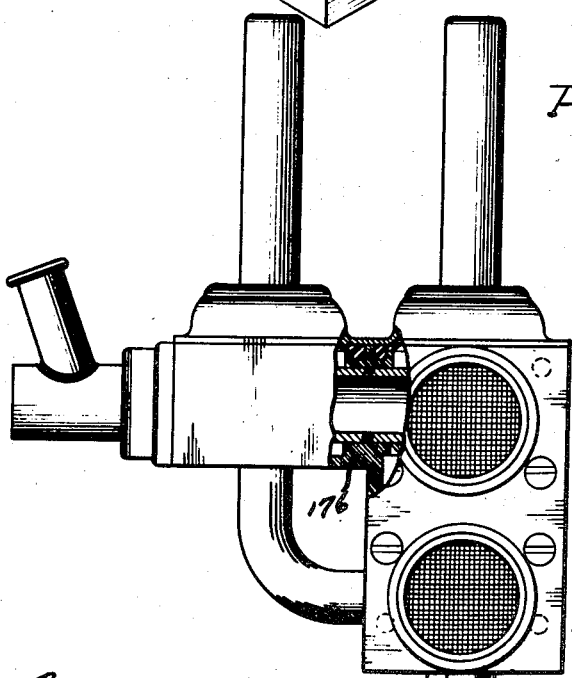

Figures 8, 9, and 10 are plan views showing the construction of the component elements forming the inlet passages of the valve of Figures 1–7;

Figures 11 and 12 are views showing construction of the body parts of Figures 1–7; and Figures 13 and 14 show an alternate construction of the valve of Figures 1–7.

As shown on the drawing:

In the top, end and side views of Figures 1, 2 and 3 respectively, the body members of the mixing valve are indicated at 20 and 22, the former being the lengthy body member containing the main fluid mixing chamber and thermostatic control element therefor and the latter being the short body member having the auxiliary mixing chamber for mixing by-pass fluid with the temperature controlled fluid from the main chamber. The main outlet member is indicated at 24 and a supporting member including an auxiliary outlet passage 27 indicated at 26. In a washing machine intended for home laundry use, for example, the auxiliary outlet passage 27 contained in member 26 may be a bleeder hole for the float chamber utilized to wash off deposits in the washing machine. Members 28 and 30 form the cold fluid and hot fluid inlet passages respectively, each having corrugations 32 to form receptacles for the attachment of a hose thereto. By-pass pipe 34 contains a fluid passage between the hot fluid inlet number 30 and the short body member 22. As will be explained in further detail hereafter, members 36 and 38 contain control elements which may be used to open or close passageways within the fluid control valve and thus regulate the temperature of the fluid in the outlet passageways of member 24.

The various component elements of the valve structure and their cooperative relationship with respect to each other, may best be understood by reference to Figures 4 and 5 which are cross-sectional views through sections IV—IV, Figure 3, and V—V, Figure 2, respectively. As will be evident from Figure 4, cold water inlet member 28 contains screen 40 to prevent entrance of foreign matter to the valve and ball check member 42. The latter member is of spherical shape and when the fluid pressure on the right hand side thereof as seen in Figure 4, exceeds the fluid pressure on the left hand side, presses against annular seat 44 to prevent fluid passage from the valve into the cold water supply pipe. Stop member 46 restrains ball check member 42 against movement in the right hand direction, as seen in Figure 4, when the pressure at the left side thereof is greater than at the right side. The entire assembly, together with cold fluid inlet member 28, is held in place in cover member 48 and auxiliary support member 50 by means of ring 52 which engages the extending portion 54 of ball check valve container 56.

The mechanism within hot fluid inlet member 30 is identical with that described above with reference to member 28 and corresponding numerals of reference are indicated on Figure 4 with respect thereto except that the subscript $a$ is added to differentiate from the corresponding parts contained in member 28. However, in this case ring 52 is omitted and the extending portion 54a of ball check valve containing member 56a is held in place by portion 58 of valve passage member 60. As will be evident from examination of Figure 4, the valve passage member 60 also defines a passage for fluid from cold fluid inlet member 28 to aperture 62 in the lengthy body member 20. Similarly, pipe 64 provides a passage from hot fluid inlet member 30 to hot fluid aperture 66 in member 20.

It is the function of the apparatus contained within the lower portion of cavity 68 in member 20 automatically to mix the fluid streams from inlets 28 and 30 to provide a fluid of desired temperature. To this end, a temperature sensitive element, shown generally at 70, is provided, the length of this element varying in accordance with the temperature of the fluid contained within cavity 68. This member is contained within housing 72, and is held in place by engagement between annular extension 74 and retainer 76. The latter member is biased by spring 78 so as continually to urge extension 74 in the downward direction relative to the main body of temperature sensitive element 70, thus holding this element in position by the engagement thereof with the inwardly extending portion 73 of housing 72. Extension 80 of temperature sensitive member 70 is held in threaded engagement with collar 82, this collar being attached to flow adjusting member 84 by engagement with the inner cap portion 83 of member 84. Spring 86 biases member 84 in the upward direction as seen in Figure 4 so as to oppose the action of element 70. Member 88 is a rubber boot which passes over the upwardly extending portion 85 of member 84 and is anchored by engagement of the annular extension 90 with the outwardly extending annular groove 91 of cavity 68. Boot 88 is constructed so that when in the position shown in Figure 4 it is stretched, thus causing this member to follow downward motion of flow adjusting member 84 and providing an annular opening between aperture 62 and the cavity 68 when member 84 moves downwardly.

Spring 86 is restrained at its lower end by closure member 92 which is attached to the bottom end of member 20. Closure member 92 also contains adjusting member 94 which is held tightly in place by engagement of its threaded portion with nut 96 and gasket 98. By removing nut 96 and inserting a screw driver in the opening of member 94, it is possible to adjust the position of member 84 relative to control element 70 and thus vary the temperature of the regulated fluid.

Control element 70 may be of any of various types well known in the art and in which the length varies as the temperature changes. The particular structure shown in the figure is adapted to the use of the so-called "Vernet" type element in which the length change with temperature is accomplished by change in the crystal structure of a substance contained within the unit. This change or transformation produces powerful expanding action which is exerted between annular member 74 and the body of the unit, thereby controlling the position of member 84.

In the operation of the above described mechanism to maintain fluid at constant temperature within cavity 68, the temperature sensitive element 70 experiences increased length between annular extension 74 and extension 80 as the temperature is raised. Thus, as the temperature in the cavity 68 is increased, flow adjusting member 84 is forced downwardly against the action of spring 86. This closes the opening between aperture 66 and cavity 68, thereby reducing the supply of hot water to cavity 68. Simultaneously, the upper portion of flow adjusting member 84 moves downwardly and rubber boot 88 provides a passage between the downwardly extending portion 75 of housing 72 to enable fluid flow from passage 62 to cavity 68. Thus, any tendency for the temperature within cavity 68 to increase is counterbalanced by decreased flow of hot fluid thereto and increased flow of cold fluid. Similarly, if the temperature within cavity 68 decreases, relatively more hot fluid is supplied thereto than cold fluid. Thus, the system acts to maintain constant fluid temperature with the cavity.

If, for any reason, such as loss of cold fluid supply, the temperature within cavity 68 should become uncontrollably great, damage to the unit from excessive expansion of member 70 between annular extension 74 and extension 80 is avoided by compression of spring 78. Thus this spring not only acts as means to hold unit 70 in place but also acts as a safety device to prevent damage to the unit from excessive temperatures.

Housing 72 is prevented from upward motion in cavity 68 by washer 100 which contains an aperture to permit passage of fluid and forms a flange about that passage. The outer rim of washer 100 engages wall 101 of cavity 68, this wall being formed between the adjacent cylindrical bores of different size at this portion of cavity 68. From the upper portion of cavity 68, fluid passes to outlet passage 102 through the fluid operated cut-off valve comprising flexible member 104, insert 106, and outlet pipe 108. Closure member 110 permits selective opening and closing of the fluid operated shut-off valve system.

The fluid operated shut-off valve portion of the mixing system is shown in the shut-off condition in Figure 4. In this case, the fluid pressure within cavity 68 is communicated to chamber 112 by a small opening 114 in flexible member 104. In this condition, the total downward force on the central portion of member 104 due to the fluid pressure on the upper surface 115 exceeds the net upward force associated with the pressure on the under surface 116. This is evident from the fact that no fluid exists in pipe 108 while equal pressure exists in chambers 112 and 68 by reason of passage 114. If, however, member 110 is moved in the upward direction, as, for example, by the pull associated with a solenoid wound about member 36, the passage within portion 106 of flexible member 104 is opened and fluid flows therethrough from chamber 112. Fluid likewise flows through opening 114 in member 104. Inasmuch as the opening 114 is incapable of passing much fluid without considerable pressure drop, the pressure within chamber 112 is greatly decreased relative to the pressure in chamber 68 and a net force acting upon flexible member 104 in the upward direction is produced. This causes member 104 to rise, thereby opening a fluid passage between the under surface of member 104 and the lip portion of pipe 108. Fluid then flows through this passage to the outlet passage 102.

Further details of the construction of the fluid control valve will be evident from examination of Figure 5. As is shown in this figure, short body member 22 is held in engagement with lengthy body member 20 and pipe 118 containing outlet passage 102 extends through both members. Further, it will be observed that short body member 22 contains cavity 120 which at its upper end is connected to outlet passage 102 by a fluid operated shut-off valve similar to that described above with reference to Figure 4. The construction and operation of this shut-off valve is identical with that of Figure 4 and corresponding numerals of reference have been marked thereon to indicate the operation thereof with respect to that description, the suffix a being added to differentiate these component elements from the corresponding elements shown in Figure 4. The operation of this portion of the apparatus has been described with reference to Figure 4 and need not be repeated here.

Hot fluid is supplied to cavity 120 by pipe 34 containing passage 122. Main outlet member 24 projects from member 26 and has opening 124 in communication with the outlet passage 102 of member 118. Resilient annulus 126 is placed between pipe 118 and member 26 to control the total fluid flow from the valve. The metering or flow control action of annulus 126 results from the fact that increased pressure within passage 102 results in deformation of annulus 126 so as to reduce the minimum area of the opening therein and hence tend to maintain constant the fluid flow to passage 124.

The dotted lines of Figure 5 further show solenoids 128 and 130 disposed about members 36 and 38 respectively. Current flow in either of these solenoids produces a magnetic field tending to raise member 110 or member 110a, thereby controlling the entrance of fluid to outlet member 118. Thus, if current flows in solenoid 128 only, the fluid temperature in outlet passage 124 will be that corresponding to the fluid within cavity 68 of member 20 whereas if current flow takes place in both solenoids the temperature of the fluid in outlet passage 124 will be modified by the fluid flow through openings 122 and 108a. Hot fluid can be admitted directly to passage 124 by applying current only to solenoid 130.

As will be evident from examination of Figure 3, cover member 48 is attached to lengthy body member 20 by a plurality of screws 132, each of which engages a correspondingly threaded hole in member 20. Similarly, closure member 134 which defines the chambers 112 and 112a, Figure 5, is attached to lengthy body member 20 by screws 136, Figure 1, and to short body member 22 by screws 138, Figure 1. Furthermore, member 26 is attached to short body member 22 by screws 140, Figure 2.

Leakage of fluids between the various members of the assembly of Figures 4 and 5 is prevented by gaskets 142 constructed of flexible material and inserted between the various engaging members. The position of these gaskets will be evident from examination of the figures. As is shown in the dotted lines of Figure 5, the attachment of body member 22, to body member 20 by closure member 134 and pipe 34 is supplemented by pins 144.

The method of construction of the fluid control valve of Figures 1 to 5 is illustrated in Figures 6 and 7 which correspond to Figures 5 and 6 respectively, but show the parts in spaced or exploded relationship. As shown in Figure 6, the cavity 68 in member 20 is symmetrical about the axis through that member except for the portions of apertures 62 and 66 into which members 60 and 64 are inserted and the opening containing pipe 118. Thus, this cavity may be machined by simple machining operations as, for example, by mounting member 20 to rotate on a lathe and inserting the cutting member of the lathe inside cavity 68 to cut that cavity in accordance with the desired shape. The portions of openings 62 and 66 for the accommodation of members 60 and 64, together with the opening required for pipe 118 may, of course, be drilled, the axis of the drill being normal to the axis of cavity 68. From Figure 7 it will be evident that the cavity 120 in member 22 may be similarly produced since this cavity includes only cylindrical sections symmetrical about the axis therethrough, together with an opening for pipe 118.

The assembly of the elements within cavity 68 and member 20 will be evident from Figure 6. These elements are all loosely mounted within the cavity 68 and are held in place by their mutual engagement when closure member 92 is attached to lengthy body member 20 by screws 146, Figure 2. Thus, the assembly operation may be completed by simply arranging the elements as shown in Figure 6 and pressing them together to the condition of Figure 4 by fixing closure member 92 in place. Inasmuch as none of the elements require fixed angular relationships with respect to each other, and the desired axial alignment is naturally produced as the elements are compressed, this assembly operation requires no time consuming exact positioning of the parts.

The hot and cold fluid inlet members 28 and 30, together with the parts located within them, may be assembled from the view of Figure 6 to that of Figure 4 by placing screen 40 within the recess of member 148 provided for the purpose, placing annular seat 44 in groove 150 of member 56 and then anchoring the complete assembly in place relative to members 48 and 50 by engagement of member 56 with washer 50 in the case of the cold water inlet and portion 58 of member 60 in the case of the hot fluid inlet member. This anchoring can be accomplished, for example, by peening over the end of members 56 and 56a to form the end portions 54 and 54a, Figure 4. A complete assembly may then be attached to lengthy body member 20 by screws 132 as shown in Figure 3.

Figure 7 shows how closure member 134, together with members 36 and 38, diaphragms 104 and 104a, and pipes 108 and 108a may be assembled and held in place by screws 138, Figure 1. In addition, this view shows how pipe 118 may be inserted through aligned openings in members 20 and 22. As is further evident from this figure, member 26, when attached to member 22 by screws 140, Figure 2, holds resilient annulus 126 in place. In addition Figure 7 shows how pipe 34 may be inserted into member 22 and then inserted into member 20 when members 20 and 22 are assembled together.

Figure 8 shows a plan view of cover member 48. As is evident from this figure, member 48 is provided with a plurality of holes 152 and has openings 154 to accommodate portions 54 and 54a of members 56 and 56a respectively. In addition, projections 156 are provided to secure members 28 and 30 from rotation relative to member 48 and the body of the mixing valve. Figure 9 shows a plan view of support member 50, this member having openings 158 for screws 132 and openings 160 for members 56 and 56a.

A plan view of valve passage member 60 is shown in Figure 10. This member has holes 162 for screws 132 and opening 164 for member 56a. However, member 60 contains depressed portion 166 and opening 168 to define the fluid passage from member 56, Figure 4, to opening 62 in member 20.

Figures 11 and 12 show how members 22 and 20, respectively, may be produced from square metal stock. As shown in Figure 11, member 22 may be produced from square stock by first drilling a hole of diameter corresponding to the desired diameter of cavity 120 and then cutting off the stock at a length corresponding to the desired length of member 22. Similarly, as shown in Figure 12, member 20 may be produced from the square stock by drilling a hole therein of diameter corresponding to the minimum diameter of cavity 68 and then cutting off the stock at length corresponding to the desired length of member 20.

Figures 13 and 14 show an alternative method of manufacturing the fluid control valve. In this case, a single L bar member 170 is used to form both body members. Two holes, 172 and 174, are placed in the bar and the length then cut off in accordance with the desired width of the complete valve. A partially sectioned view of the resultant valve is shown in Figure 14 where it is evident that a single member 170 serves to contain the elements contained within separate members 20 and 22 of the valve of Figures 1–12.

From the above description it will be evident that my invention provides an improved fluid mixing valve wherein no castings are required and which may be assembled with ease. In particular, the various components used in the valve such as members 104 and 104a, springs 86 and 78, resilient annulus 126, etc., may be standard parts used in this type valve as well as other valves intended for different purposes. Special members, such as 48, 50, 60, and 134 may be stamped from sheet metal by rapid low cost mass production methods. Finally, the members 20 and 22 may be produced from standard metal stock by simple machining operations. The net result of this construction as contrasted with casting is to reduce the cost of the mixing valve to as little as one-half the cost of an equivalent valve using castings.

It will further be observed that the inner surfaces exposed to fluid flow within the valve are all machined surfaces and may readily be machined to a very smooth condition, thereby offering minimum impedance to the passage of fluid therethrough and introducing the least possible tendency toward deposit thereon of undesired material from the fluid.

While I have shown particular embodiments of my invention, it will, of course, be understood that I do not wish to be limited thereto since many modifications both in the elements employed and their cooperative arrangement may be made without departing from the spirit and scope thereof. I, of course, contemplate by the appended claims to cover any such modifications as fall within the true spirit and scope of my invention.

I claim as my invention:

1. A fluid mixing valve of the type wherein controlled streams of fluid are mixed to obtain a resultant fluid stream, said valve having a body having an inner side wall defining a fluid mixing cavity extending therethrough, said caving being symmetrical about an axis through said body, said body also having two axially spaced openings in communication with said cavity to admit fluid streams thereto, an axially shiftable element contained within said cavity, an annular boot of flexible material passing over one end of said element and in engagement with the wall of said cavity in the region between said openings, means providing a wall of decreased diameter between the end of said element covered by said boot and the corresponding end of said cavity so as to prevent fluid flow from one of said openings to said cavity when said boot engages said wall, a closure for the end of said cavity, said closure having a surface to be engaged by the opposite end of said element to prevent fluid flow to said cavity from said other opening, whereby the complete assembly may be made by inserting said element and said boot into said cavity and attaching said closure member to said body, said boot being constructed so as to remain in a stretched condition in all normal positions of said element so as to follow the movements thereof.

2. A fluid mixing valve of the type wherein controlled streams of fluid are mixed to obtain a resultant fluid stream, said valve having a body having an inner side wall defining a fluid mixing cavity extending therethrough, said cavity being symmetrical about an axis through said body, said body also having two axially spaced openings in communication with said cavity to admit fluid streams thereto, an axially shiftable element contained within said cavity, an annular boot of flexible material passing over one end of said element and having an annular projection in engagement with a corresponding recess in the wall of said cavity in the region between said openings, means providing a wall of decreased diameter between the end of said element covered by said boot and the corresponding end of said cavity so as to prevent fluid flow from one of said openings to said cavity when said boot engages said wall, a closure for the opposite end of said cavity, said closure having a surface to be engaged by the opposite end of said element to prevent fluid flow to said cavity from said other opening, whereby the complete assembly may be made by inserting said element and said boot into said cavity and attaching said closure member to said body.

3. A fluid mixing valve of the type wherein controlled streams of fluid at different temperatures are mixed to obtain a resultant fluid stream of intermediate temperature having a body having an inner side wall defining a fluid mixing cavity extending therethrough, said cavity being symmetrical about an axis, said body also having two axially spaced openings in communication with said cavity to admit streams of fluid thereto, an axially shiftable element contained within said cavity, an annular boot of flexible material passing over one end of said element and having an outwardly extending annular projection in engagement with a corresponding recess in the wall of said cavity in the region between said openings, means providing a wall of decreased diameter between said one end of said element and the corresponding end of said cavity so as to prevent fluid flow from one of said openings to said cavity when said boot engages said wall, a closure for the other end of said cavity, said closure having a surface to be engaged by the opposite end of said element to prevent fluid flow to said cavity from said other opening, a compression spring between said element and said closure to urge said element away from said closure, and temperature responsive means to urge said element away from said wall as the fluid temperature within said cavity approaches the desired temperature.

4. A fluid mixing valve of the type wherein fluids of different temperatures combine to produce a fluid of intermediate temperature, said valve having a body, said body having an inner side wall defining a cylindrical cavity, said side wall having two axially spaced portions of increased diameter forming fluid passageways extending therearound, an inlet for cool fluid in communication with one of said passageways, an inlet for warm fluid in communication with the other of said passageways, said cavity having an abrupt decrease in diameter between the other of said passageways and the corresponding end of said cavity, a cap slidably mounted within said cavity in engagement with the wall formed by said decrease in diameter and partially extending over the other of said passageways, a closure for an end of said cavity, a closure for the opposite end of said cavity, a cylindrical valve slidably disposed between said cap and one of said closures in fluid tight relation with the wall of said cavity in the region between said pasageways and axially movable into engagement with said cap to close one of said passageways or into engagement with said one of said closures to close the said other pasageway, means to bias said valve in one direction, and temperature responsive means connected between said cap and valve to overcome said bias in accord with the fluid temperature, in said cavity and maintain constant the temperature of fluid therein.

5. A mixing valve adapted for ready assembly and disassembly comprising a hollow valve block having an inner side wall defining a fluid mixing cavity, two axially spaced inlets leading through said side wall into said cavity, a supporting cap mounted within said cavity by slidable movement therein, and having an annular wall portion engaging said wall of said cavity and passing partially over one of said inlets, the end thereof extending over said inlet forming an annular valve seat and having outlets therein for the discharge of liquid therethrough, an extensible member extending from said supporting cap, a spring interposed between said extensible member and supporting cap and retaining said extensible member thereto, an end closure member for the end of said cavity opposite from said support member and having an inner surface forming a valve seat, an annular valve member mounted within said cavity between said supporting cap and said closure member, and an operative connection between said valve member and said extensible member, moving said valve member along said cavity, into engagement with said supporting cap and into engagement with said closure member, to block the passage of fluid through either of said inlets upon extensible or retractible movement of said extensible member, and a spring interposed between said end member and said valve member and urging said extensible member in a retracted position and also holding said supporting cap, extensible member and valve member within said cavity as a unit upon the securing of said end closure member to the end thereof.

6. A mixing valve adapted for ready assembly and disassembly comprising a hollow valve block having an inner side wall defining a fluid mixing cavity extending therethrough, two axially spaced inlets leading through said side wall into said cavity, an axially movable annular valve member engaging said side wall between said inlets and having fluid tight engagement with said side wall to block the passage of fluid between said side wall and valve member from one inlet to the other, an inward projection from said side wall adjacent one end thereof and in spaced relation with respect to said inlets, a supporting cap mounted within said cavity by slidable movement therein into engagement with said projection and having an annular wall portion engaging said wall of said cavity and passing partially over one of said inlets, and adapted to be engaged at the edge of said valve member, and form a seat, to block the passage of fluid through said inlet, an extensible member extending from said supporting cap and having operative connection with said valve member, to rectilinearly move said valve member along said wall upon extensible or retractible movement of said extensible member, a spring interposed between said supporting cap and extensible member and retaining said member within said cap, and an end closure member for the end of said cavity opposite from said support member and having an inner surface forming a valve seat adapted to be engaged by said valve member and block the passage of fluid through said other inlet, said support cap extensible member and valve member all being connected as a unit and being so constructed and arranged as to be bodily removable as a unit from said cavity upon removal of said closure member.

7. A mixing valve adapted for ready assembly and disassembly comprising a hollow valve block having an inner side wall defining a fluid mixing cavity extending therethrough, two axially spaced inlets leading through said side wall into said cavity, an axially movable annular valve member engaging said side wall between said inlets and having fluid tight engagement with said side wall to block the passage of fluid between said side wall and valve member from one inlet to the other, an inward projection from said side wall adjacent one end thereof and in spaced relation with respect to said inlets, a supporting cap mounted within said cavity by slidable movement therein into engagement with said projection and having an annular wall portion engaging said wall of said cavity and passing partially over one of said inlets, and adapted to be engaged at the edge of said valve member, and form a seat, to block the passage of fluid through said inlet, a temperature responsive member extending from said supporting cap, and being extensible upon a predetermined rise in temperature within said cavity and having operative connection with said valve element, to rectilinearly move said valve element along said wall upon extensible or retractible movement of said extensible member, a spring interposed between said supporting cap and extensible member and retaining said member within said cap, an end closure member for the end of said cavity opposite from said support member and having an inner surface forming a valve seat adapted to be engaged by said valve member and block the passage of fluid through said inlet, and a spring interposed between said closure member and valve member and urging said temperature responsive member into a retracted position, and maintaining said cap, temperature responsive member and valve member in the proper relations with respect to each other within said cavity.

8. In a fluid mixing valve of the type adapted to mix fluids of different temperatures and deliver fluid at a predetermined constant temperature, a hollow body having an inner side wall defining a fluid mixing cavity, two axially spaced inlets into said cavity through said side wall, an annular valve seat partially covering one of said inlets, a valve element mounted within said cavity for movement therealong, a flexible boot interposed between said side wall and said valve element in the space between said inlets, and extending over an end of said valve element and sealing the space between said inlets and opening or closing one of said inlets upon axial movement of said valve element with respect to said valve seat, a closure member for one end of said cavity having an inner surface forming a valve seat adapted to be engaged by the end of said valve element opposite said boot and to close the other of said inlets, spring means urging said valve element into position to close one of said inlets, and temperature responsive means within said cavity and acting against said spring means, to close the other of said inlets.

9. In a fluid mixing valve of the type adapted to mix hot and cold liquids and to deliver liquid at a predetermined constant temperature, a hollow body having an inner side wall defining a fluid mixing cavity, two axially spaced inlets in said cavity through said side wall, an annular valve element mounted within said cavity for movement therealong, and having a cylindrical wall portion, a flexible boot connected to one end of said valve element and interposed between the side wall of said cavity and the wall portion of said valve and adapted to seal the space between said inlets and control the passage of fluid through one inlet, a closure member for the end of said cavity opposite from said one inlet and having an inner surface forming a seat adapted to be engaged by the end of said valve element opposite from said boot and block the passage of fluid through said other inlet, spring means interposed between said closure member and said valve element and urging said valve element and boot into position to close said one inlet, and temperature responsive means within said cavity and acting against said spring means to move said valve element into position to close the other of said inlets upon a predetermined temperature rise within said cavity.

LESLIE A. KEMPTON.

REFERENCES CITED

The following references are of record in the file of this patent:

UNITED STATES PATENTS

| Number | Name | Date |
|---|---|---|
| 113,503 | Dinnen | Apr. 11, 1871 |
| 1,752,116 | Smith | Mar. 25, 1930 |
| 2,296,266 | Breckenridge | Sept. 22, 1942 |
| 2,326,096 | Dillman | Aug. 3, 1943 |
| 2,444,631 | Chace | July 6, 1948 |

FOREIGN PATENTS

| Number | Country | Date |
|---|---|---|
| 421,900 | Great Britain | Jan. 2, 1935 |
| 792,774 | France | Oct. 28, 1935 |

OTHER REFERENCES

Sarco, Catalog sheet, A. I. A. File 29–D21, Sarco No. 140, published June 1936 by Sarco Company, Incorporated, 188 Madison Avenue, New York, New York (two pages).